M. G. REED.
SHOCK ABSORBER.
APPLICATION FILED AUG. 26, 1915.
1,201,761. Patented Oct. 17, 1916.
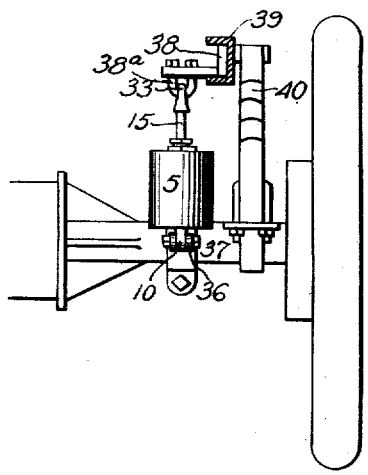
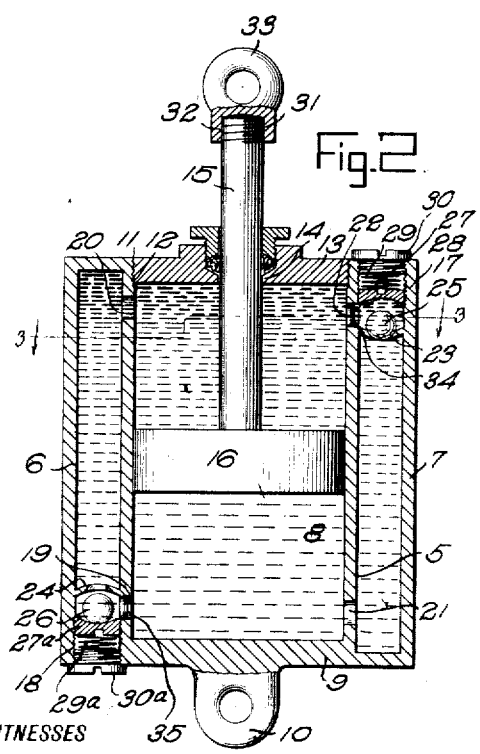
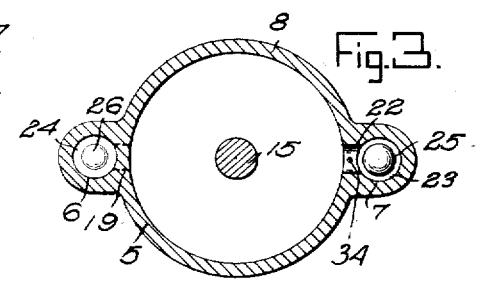
WITNESSES
C. H. Reichenbach
E. B. Marshall
INVENTOR
Marlin G. Reed
BY
ATTORNEYS

UNITED STATES PATENT OFFICE.

MARLIN GRAVES REED, OF BROOKVILLE, PENNSYLVANIA.

SHOCK-ABSORBER.

1,201,761.

Specification of Letters Patent.

Patented Oct. 17, 1916.

Application filed August 26, 1915. Serial No. 47,458.

*To all whom it may concern:*

Be it known that I, MARLIN G. REED, a citizen of the United States, and a resident of Brookville, in the county of Jefferson and State of Pennsylvania, have invented a new and Improved Shock-Absorber, of which the following is a full, clear, and exact description.

My invention has for its object to provide a shock absorber of the hydraulic type in which a piston works in a cylinder, the ends of which are connected by two by-passes, there being a valve in each by-pass one of which is normally closed and is opened by an upward flow of the fluid caused by a downward movement of the piston, the other valve being normally open to be closed by the upward movement of the fluid in the by-pass when the velocity of the fluid in the by-pass reaches a pre-determined rate. With this construction the fluid will flow upward in the two by-passes except when the piston moves down very quickly when the second by-pass will be closed by its valve and the fluid will only flow upward in the first mentioned by-pass. The shock absorber is in this way stiffened when the shock is severe while retaining all the desired freedom of movement under normal conditions.

Additional objects of the invention will appear in the following specification in which the preferred form of my invention is disclosed.

In the drawings similar reference characters refer to similar parts in all the views, in which—

Figure 1 is a view showing a portion of a vehicle to which is secured my shock absorber; Fig. 2 is a sectional elevation of my shock absorber; and Fig. 3 is a sectional view on the line 3—3 of Fig. 2.

By referring to the drawings it will be seen that my shock absorber is constructed with a cylinder 5 having a central opening 8 and two passages 6 and 7 spaced from the said central opening 8. The bottom of the cylinder 5 is provided with a head 9 which is provided with a depending eye 10, the upper end of the cylinder having an inner head 11 in which meshes a thread 12 on a cylinder head 13. This cylinder head 13 has an opening 14, through which a piston rod 15 is disposed, the piston rod 15 being secured to a piston 16 disposed in the cylinder 5. The upper end 17 of the passage 7 is open and is provided with an inner thread, the lower end 18 of the passage 6 being also open and being also provided with an inner thread. The lower end of the passage 6 is connected with the central opening 8 of the cylinder 5 by an opening 19, and the upper end of the passage 6 is connected with the said central opening 8 by an opening 20. The lower end of the passage 7 is connected with the said central opening 8 by a passage 21, and the upper end of the passage 7 is connected with the central opening 8 by an opening 22.

Disposed in the passage 7 below the opening 22, there is a valve seat 23 and disposed in the passage 6 above the opening 19 there is a valve seat 24, there being a ball valve 25 for coöperating with the valve seat 23 and a ball valve 26 for coöperating with the valve seat 24. As a means of limiting the upward movement of the ball valve 25, a cap 27 having an outer thread, is screwed in the threaded opening 17, the cap 27 being provided with a slot 28 by which it may be readily turned to any desired position with reference to the valve seat 23. A spring 29 is disposed against the cap 27 and a plug 30 is screwed in the threaded opening 17, the plug 30 holding the spring 29 in position so that it will press against the cap 27 and prevent the cap 27 from turning. In a similar manner a cap 27ª is secured in the opening 18 in the passage 6, a spring 29ª and a block 30ª serving purposes similar to the purposes served by the spring 29 and the plug 30.

The upper end of the piston rod 15 has an outer thread 31 with which meshes an inner thread 32 with which the eye 33 is provided. As will be seen by referring to Fig. 1 of the drawing, the eyes 10 and 33 are used to secure the shock absorber with a spring and with portions of a vehicle to absorb shocks in a manner readily understood. When the shock is not severe, the piston 16 is moved downwardly and the fluid contained in the central opening 8 will flow through the openings 19 and 21 to the passages 6 and 7 and up these passages and through the openings 20 and 22 to the central opening 8 above the piston 16. However, when the shock is severe and the piston 16 moves downward quickly, the flow of the fluid through the opening 19 will serve to move the ball valve 26 upwardly and against its seat 24 to prevent the flow of fluid up in the passage 6, and the fluid will, therefore, only flow upward in the passage 7. In this way the shock absorber is greatly stiffened when an unusual shock occurs. A bar 34 is disposed in the opening 22 and a bar 35 is disposed in the opening 19 to prevent the ball valves 25 and 26 from entering the central cylinder opening 8.

In Fig. 1 the cylinder 5 is clamped at its eye 10 by a clamp 36 to the vehicle axle 37, the piston rod at its eye 33 being articulated to the eye 38ᵃ on the arm 38 secured to the frame 39. The axle 37 and the frame 39 are connected by the usual spring 40.

Having thus described my invention I claim as new and desire to secure by Letters Patent:

1. In a shock absorber, a cylinder having its ends connected by two by-passes, a valve in one of the by-passes normally closed and adapted to be opened by the flow of the fluid in the by-pass in that direction, a valve seat in the other by-pass normally open, and a valve free to be moved by the flow of the fluid in the last by-pass against the valve seat when the velocity of the fluid exceeds a predetermined rate, and a piston in the cylinder.

2. In a shock absorber, a cylinder having a head with an opening and two by-passes, connecting its ends, a piston in the cylinder, a piston rod secured to the piston and extending through the opening in the cylinder head, a valve seat in each by-pass, two ball valves for coöperating with the valve seats, one disposed between a valve seat and one end of the cylinder, and the other disposed between the other valve seat and the other end of the cylinder, and means to limit the movement of the ball valves away from their valve seats.

3. In a shock absorber, a vertically disposed cylinder, having a head with an opening and two by-passes connecting the ends of the cylinder, a piston in the cylinder, a piston rod secured to the piston and extending through the opening in the cylinder, a valve seat in each by-pass, two ball valves, one in each of the by-passes for coöperating with the valve seats, one disposed above and the other below its valve seat, and means to limit the movement of the ball valves away from their valve seats.

4. In a shock absorber, a vertically disposed cylinder having a central opening and two heads in one of which there is an opening, there being two vertical by-passes in the cylinder at the sides of the central opening with openings connecting the top and bottom of each by-pass with the central opening in the cylinder, a piston in the central opening, a piston rod secured to the piston and disposed through the opening in the cylinder head, a valve seat in each passage, a ball valve in each passage for coöperating with the valve seats, one disposed above and the other below the valve seat, means to prevent the ball valves from passing through the openings connecting the passages with the central opening, and means to limit the movement of the ball valves away from their seats in the passages.

5. In a shock absorber, a cylinder having a central opening with two heads, and with an opening in one of the heads, a piston disposed in the cylinder, a piston rod secured to the piston and disposed through the opening in the cylinder head, there being two by-passes in the cylinder at the sides of the central opening with openings connecting the ends of the by-passes with the central opening, one of the by-passes extending through one end of the cylinder, and the other by-pass extending through the other end of the cylinder, a valve seat in each passage between the opening to the central cylinder opening adjacent the open end of the by-pass and the other end of the cylinder, two ball valves for coöperating with the valve seats, one disposed between each valve seat and the open end of the by-pass in which the valve seat is disposed, caps adjustably secured in the by-pass for limiting the movement of the ball valves away from the valve seats, springs resting on the caps for holding the caps in adjusted position, and plugs secured in the open ends of the by-passes for engaging the springs.

6. In a shock absorber, a cylinder having a central opening with two heads, and with an opening in one of the heads, a piston disposed in the cylinder, a piston rod secured to the piston and disposed through the opening in the cylinder head, there being two by-passes in the cylinder at the sides of the central opening with openings connecting the ends of the by-passes with the central opening, one of the by-passes extending through one end of the cylinder, and the other by-pass extending through the other end of the cylinder, a valve seat in each passage between the opening to the central cylinder opening adjacent the open end of the by-pass and the other end of the cylinder, two ball valves for coöperating with the valve seats, one disposed between each valve seat and the open end of the by-pass in which the valve seat is disposed, caps adjustably secured in the by-passes for limiting the movement of the ball valves away from the valve seats, springs resting on the caps for holding the caps in adjusted position, plugs secured in the open ends of the by-passes for engaging the springs, and bars at the openings from the by-passes to the central cylinder opening adjacent the valve seats, to prevent the movement of the ball valves into the central cylinder opening.

7. In a shock absorber, a cylinder having its ends connected by a by-pass, a piston in the cylinder, a valve seat at the by-pass, and a valve for coöperating with the valve seat, the valve being normally spaced from the valve seat to be moved by an abnormal flow of fluid in one direction against the valve seat while permitting the free and continuous normal movement of the fluid in the said direction through the valve seat.

In testimony whereof I have signed my name to this specification in the presence of the two subscribing witnesses.

MARLIN GRAVES REED.

Witnesses:
GEO. W. BARRICK,
W. J. SHOFSTAHL.